United States Patent [19]

Pfundstein

[11] 4,186,816

[45] Feb. 5, 1980

[54] SUPPLEMENTARY HYDROSTATIC DRIVE ELECTRONIC CONTROL

[75] Inventor: Donald K. Pfundstein, Peosta, Iowa

[73] Assignee: Deere & Company, Moline, Ill.

[21] Appl. No.: 910,572

[22] Filed: May 30, 1978

[51] Int. Cl.² ............................................. B60K 17/34
[52] U.S. Cl. .................................................... 180/243
[58] Field of Search ................ 180/44 M, 44 F, 44 E, 180/44 R, 49, 105, 82 D

[56] References Cited

U.S. PATENT DOCUMENTS

| | | | |
|---|---|---|---|
| 3,499,689 | 3/1970 | Carp et al. | 180/82 D |
| 3,780,820 | 12/1973 | Schwab et al. | 180/44 M |

*Primary Examiner*—John A. Pekar

[57] ABSTRACT

An electronic control for a vehicle supplementary hydrostatic front wheel drive includes a rear sensor for providing a command signal representative of the speed of differential connected, engine-driven, main drive wheels. A front sensor provides a feedback signal representative of the speed of the hydrostatic drive motors. The command signal is modified to provide a modified command signal to be summed with the feedback signal to provide servo circuitry with a servo signal which is representative of the front wheels being driven 3% slower than the rear wheels. Electrically actuated, pressure responsive clutches allow the front wheels to overrun the hydrostatic drive motors until the slip at the rear wheels exceeds 3%, then the front wheels drive to supplement the main drive wheels. A selectable overspeed circuit is provided which can modify the modified command signal to provide a servo control signal which represents the front wheels being driven 1% faster than the rear wheels so as to provide a continuous, positive supplementary drive regardless of rear wheel slip. The servo control signal is processed through direction controllers which input the direction of the main drive wheels and which supply control signals to a servo actuator on a reversible hydraulic pump which powers the hydrostatic drive motors for drive in accordance with main drive speed and direction. Both the servo and overspeed circuits are connected to a hold circuit which activates and holds the overspeed circuit on to provide quick response when the direction of the main drive is changed.

21 Claims, 3 Drawing Figures

FIG. 3

SUPPLEMENTARY HYDROSTATIC DRIVE ELECTRONIC CONTROL

BACKGROUND OF THE INVENTION

The present invention relates generally to electronic controls for hydrostatic front wheel drives and more particularly to a three mode hydrostatic drive in which the hydrostatic drive wheels can be nondriving, nondriving until a predetermined main drive wheel slip is exceeded, or continuously driving.

In the past, hydrostatic drive wheels have been developed which automatically shifted between two or more torque levels in response to transmission ratio and/or hydraulic system pressure. These systems were continuously powered to provide supplementary hydrostatic drive for the main drive and had no provision for operating only on demand when the main drive loses traction and slips beyond a predetermined percentage. Similarly, previous systems have set the pressure of the hydrostatic drive at one or more levels rather than having the hydrostatic drive infinitely speed variable with a predetermined percentage of overspeed to provide a continuous, positive supplement to the main drive.

SUMMARY OF THE INVENTION

The present invention provides a closed loop electronic speed feedback system which in one operative mode allows a predetermined percentage of slip of the main drive wheels before the hydrostatic drive wheels begin to supplement the main drive wheels and which in a second operative mode provides a predetermined percentage of overspeed of the hydrostatic drive wheels to provide continuous, positive supplementary of the main drive wheels.

The present invention further provides a closed loop feedback system with inbuilt filtering to prevent hydrostatic drive speed hunting while providing rapid response to rapid shifts in the main drive direction as when the vehicle is mired in mud and the vehicle is rocked rapidly back and forth to free it.

The present invention further provides clamping circuitry to prevent excessive power loss when the hydraulically powered wheel motors are stalled.

The present invention further provides for reversible operation of the hydrostatic drive with the reversals of the main drive and with speed control in both forward and reverse modes.

The above and additional advantages of the present invention will become apparent to those skilled in the art from a reading of the following detailed description when taken in conjunction with the accompanying drawing.

DESCRIPTION OF THE PREFERRED EMBODIMENT

Figures 1, 2:
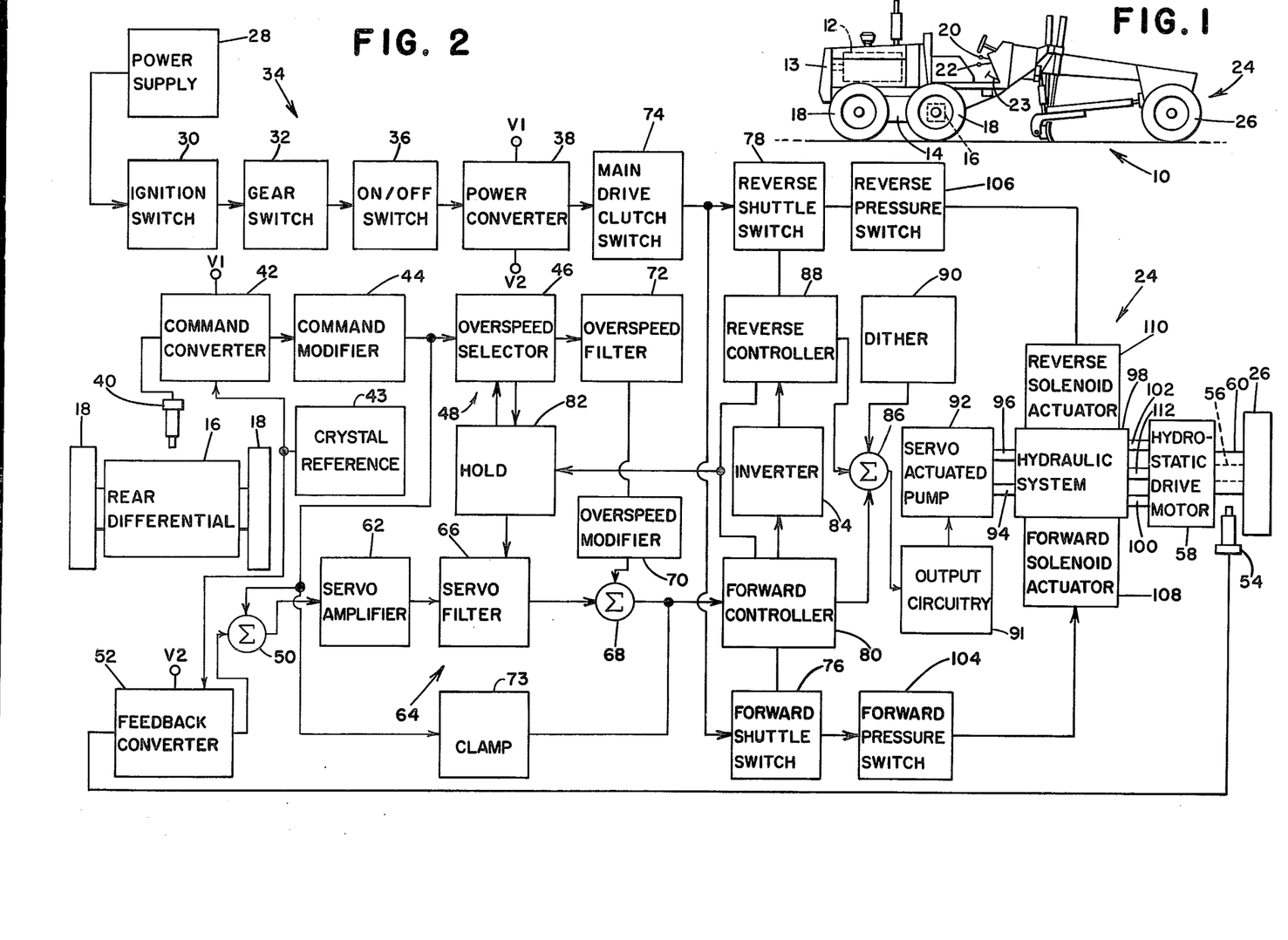
FIG. 1 is a side view of an industrial motor grader schematically illustrating the general location of most of the principal drive components including the hydrostatic drive.
FIG. 2 is a schematic illustration and block diagram of the electronic control embodying the present invention.

Referring now to FIG. 1, therein is shown an industrial motor grader 10 having a main internal combustion engine 12 driving a hydraulic pump 13 and driving through a conventional hydraulically actuated power shift transmission 14 and a rear differential 16 to rear drive wheels 18. The power shift transmission 14 is controlled by a shuttle lever 20, a gear shift lever 22, and a main drive clutch 23 which are all located at the operator's console. The shuttle lever 20 is movable among forward, neutral, and reverse positions while the gearshift lever 22 is movable between neutral and first through eight gear speed ratios.

The motor grader 10 is equipped with a supplementary front wheel drive system generally designated by the numeral 24 which includes a pair of front drive wheels 26. The supplementary drive system 24 will be described in greater detail later.

Referring now to FIG. 2, therein is shown a vehicle battery power supply 28 which is connected with and disconnected from the vehicle electrical system by means of a key operated ignition switch 30. To control the supplementary front wheel drive system 24, the ignition switch 30 is connected to a gear switch 32 which is a part of the electronic control generally designated by the numeral 34. The gear switch 32 opens and closes in response to movement of the gear shift lever 22 to restrict operation of the electronic control 34 to predetermined lower gear speed ratios. The gear switch 32 is connected to a manually operable on/off switch 36. The on/off switch 36 is connected to a conventional power converter 38 which converts the motor grader power supply voltage into voltages usable by the other components in the electronic control 34 as would be evident to those skilled in the art.

One of the components which utilizes the voltages from the power converter 38 is a rear sensor 40 which senses the input speed at the rear differential 16 so as to provide a signal representative of the average rear wheel speed before differential action. The rear sensor 40 is a conventional digital magnetic pickup providing a constant amplitude digital pulse with frequency proportional to speed. Digital pulses are utilized because they are less subject to environmental electrical noise when running long wire distances as is common in motor graders.

The rear sensor 40 is connected to a frequency to voltage converter designated as the command converter circuitry 42 which is referenced by a signal from a crystal reference circuitry 43 as would be evident to those skilled in the art. The command converter circuitry 42 is connected to command modifier circuitry 44 which inverts and modifies input signals by a first predetermined percentage. The command modifier circuitry 44 is connected to an overspeed selector 46 in overspeed circuitry 48 which will be described in greater detail later. The command modifier 44 is further connected to first summing circuitry 50.

The first summing circuitry 50 is further connected to a frequency to voltage converter designated as feedback converter 52 which is similar to and is referenced by the same signal from the crystal reference circuitry 43 which references the command converter circuitry 42. The feedback converter circuitry 52 is connected in turn to a front sensor 54 which is the same type of digital magnetic pickup as the rear sensor 40.

The front sensor 54 is operatively associated with the supplementary drive 24 and is positioned to sense the speed of a rotor 56 of one hydrostatic drive motor 58 of the two which drive the two front drive wheels 26. It should be noted that the rotor 56 (one of two) does not necessarily turn at the same speed as the front drive wheel 26 since it is connected thereto by a pressure engageable clutch 60 (one of two).

Returning now to the first summing circuitry 50, it is connected to a servo amplifier 62 in servo circuitry 64. The servo amplifier 62 serves to amplify signals out of the first summing circuitry 50. The servo amplifier 62 is further connected to a conventional servo filter 66 which regulates the rate of change of signals out of the servo amplifier 62 to a first predetermined rate. The servo filter 66 is connected to second summing circuitry 68.

The second summing circuitry 68 is further connected to an overspeed modifier 70 in the overspeed circuitry 48. The overspeed modifier 70 modifies input signals by a predetermined percentage which is representative of the front drive wheels 26 overspeeding the rear drive wheels 18 by a second predetermined percentage. The overspeed modifier 70 is connected to an overspeed filter 72 which regulates the rate of change of signals from the overspeed selector 46 to a second predetermined rate for increasing signals and a third predetermined rate for decreasing signals.

The output of the second summing circuitry 68 is modified as will later by explained by being connected to clamp circuitry 73 which receives signals from and is connected between the command modifier circuitry 44 and the overspeed selector 46.

Returning now to the power converter 38, a main drive clutch switch 74 is connected thereto. The main drive clutch switch 74 is positioned on the transmission clutch pressure valve (not shown) and opens whenever the main drive clutch 23 is depressed causing the transmission clutch pressure to decrease. The main drive clutch switch 74 in turn is connected to forward and reverse shuttle switches 76 and 78 which are controlled by the shuttle lever 20 and close respectively in response to the shuttle lever 20 being positioned in the forward or reverse position.

The forward shuttle switch 76 is connected to forward controller circuitry 80 which is connected to receive an input from the second summing circuitry 68. The forward controller circuitry 80 is further connected to hold circuitry 82 in the overspeed circuitry 48, to a conventional inverter 84, and to a third summing circuitry 86. The inverter 84 is connected to reverse controller circuitry 88 which in turn is connected to the reverse shuttle switch 78.

Both the forward and reverse controller circuitries 80 and 88 are connected to the third summing circuitry 86 and are summed with a dithered output from a conventional dither 90 to provide a control signal for a voltage to current converter generally designated as output circuitry 91. The output circuitry 91 drives a current-controlled servo valve which controls the displacement of a hydraulic pump 13; this assembly is designated as servo actuated pump 92.

The servo actuated pump 92, in response to positive or negative current signals from the output circuitry 91, will respectively pressurize forward or reverse pressure lines 94 or 96. The pressure lines 94 and 96 are connected to the hydraulic system 98 which includes components like a flow divider, relief, shuttle, and solenoid valves, etc. and causes pressurization of forward or reverse pressure lines 100 or 120 to respectively drive the hydrostatic drive motor 58 in forward or reverse as would be evident to those skilled in the art. The flow divider (not shown) allows partial differential action between the pair of front wheels 26 while causing differential lock so that torque is provided to both front drive wheels 26 when one wheel slips excessively with respect to the other as would also be evident to those skilled in the art.

Referring back to the forward and reverse shuttle switches 76 and 78, they are connected respectively to forward and reverse pressure switches 104 and 106 which are responsive to the hydraulic modulation pressures in the power shift transmission 14 which are indicative of rear wheel rotation after shifts of the transmission to forward or reverse speed ratios. The forward and reverse pressure switches 104 and 106 are connected respectively to forward and reverse solenoid actuators 108 and 110 on the hydraulic system 98. The forward and reverse solenoid actuators 108 and 110 act to connect the drive pressure in pressure lines 94 or 96 to clutch pressure lines 112 (only one shown) to cause the clutches 60 to connect the rotors 56 to the front drive wheels 26.

When the front drive wheels 26 are turning faster than the hydrostatic drive motors 58, the motors 58 are momentarily driven by the front drive wheels 26 through the clutches 60 and this causes a reduction in pressure in whichever lines are pressurized to power the drive motors 58. The reduction in the pressure to the hydrostatic drive motors 58 naturally causes a reduction in the pressure holding the clutches 60 in the activated position causing deactivation of the clutches 60. Thus, when the front drive wheels 26 run faster than the hydrostatic drive motors 58 the clutches 60 will tend to be running with a minimal engagement pressure allowing the front drive wheels 26 to overrun the hydrostatic drive motors 58.

Figure 3:
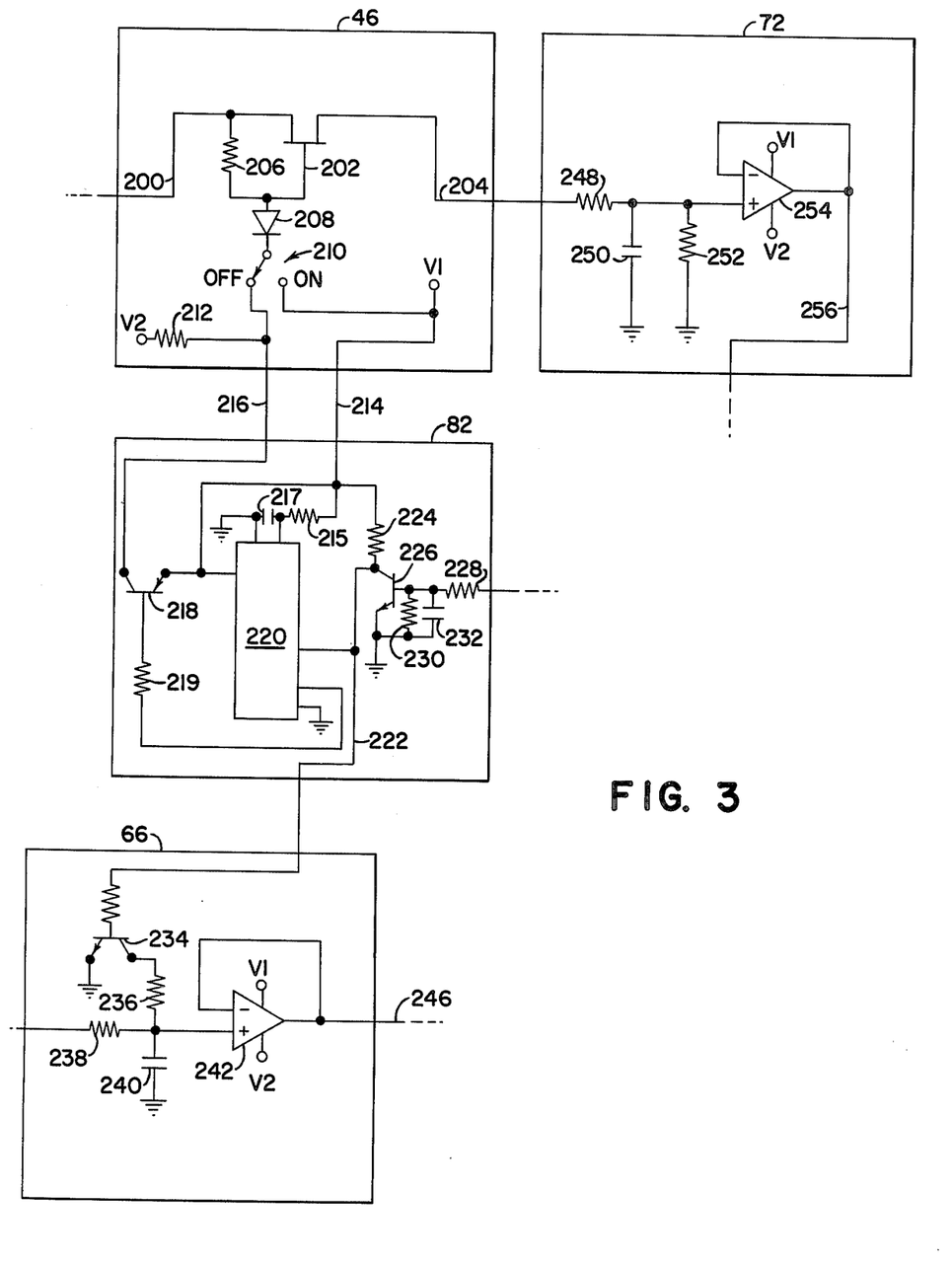
FIG. 3 is a schematic illustration of a portion of the present invention.

Referring now to FIG. 3, therein are shown the overspeed selector 46, the overspeed filter 72, the hold circuitry 82, and the servo filter 66. For purposes of this disclosure, the values of the resistors, capacitors, diodes, etc. will be ignored as being obvious to those skilled in the art and the power inputs from the power converter 38 will be considered to be VI and V2 with VI greater than V2.

In the overspeed selector 46 there is an input line 200 connected by a field effect transistor 202 to an output line 204. The input line 200 is connected by a resistor 206 to the control input of the field effect transistor 202 and to a diode 208. The diode 208 is connected to a manually operable overspeed selector switch 210 which selectively connects the diode 208 to potential V2 through a resistor 212 in the "off" position or to potential V1 in the "on" position. The V1 potential and the resistor 212 are connected by leads 214 and 216 respectively to the emitter and collector, respectively, of a PNP transistor 218 in the hold circuitry 82. The lead 214 is further connected to a resistor 215 and a capacitor 217 to ground.

The hold circuitry 82 contains a conventional, commercially available one-shot 220 which has an output connected to the base of transistor 218 through a resistor 219. One timing input is connected to between the resistor 215 and capacitor 217 while another is connected to ground. A control input to the one-shot 220 is connected to a lead 222 which is connected through a resistor 224 to the V1 potential via lead 214 and to the collector of an NPN transistor 226. The base of the transistor 226 is connected through a resistor 228 to both the forward and reverse controller circuitries 80 and 88. The base of the transistor 226 is connected to ground through a resistor 230 and a capacitor 232. The emitter of the transistor 226 is connected directly to ground.

The lead 222 is further connected to the base of an NPN transistor 234 in the servo filter 66. The emitter of the transistor 234 is connected to ground while the collector is connected through a resistor 236 to the servo filter capacitor 240. An input resistor 238 is connected to between the resistor 236 and the capacitor 240, and to the input of a commercially available operational amplifier 242. The output of the amplifier 242 is through a lead 246 which is connected to the second summing circuitry 68.

Returning now to the output line 204 out of the overspeed selector 46, it is connected to a resistor 248 in the overspeed filter circuitry 72. The resistor is connected to ground through a capacitor 250 and a resistor 252 which are in parallel. The resistor 248 is further connected to the input of a commercially available amplifier 254 whose output is connected by a lead 256 to overspeed modifier circuitry 70.

OPERATION

The supplementary drive 24 for the motor grader 10 has three modes of operation. The first mode is the "off" mode in which the front drive wheels 26 are free running and unpowered. The second mode is the "normal" mode where the front drive wheels 26 are free running and unpowered until the rear wheels 18 slip the first predetermined percentage. The third mode is the "overspeed" mode in which the front drive wheels 26 are continuously powered by the drive motors 58 to run at the second predetermined percentage faster than the rear wheels 18. In the preferred embodiment, it has been determined that the motor grader 10 should operate at a 3% slip which was chosen to eliminate speed interactions between front and rear wheel drive train components when there is no drawbar pull. The 3% establishes the first predetermined percentage previously mentioned. It has further been determined that a 1% overspeed of the front drive wheels 26 provides more aggressive supplementary drive operation which establishes the second predetermined percentage.

Referring now to FIG. 2, it may be seen that the "off" mode may be achieved in four different ways. First, by opening the gear switch 32 which occurs when the gearshift lever 22 is shifted to either neutral or higher speed ratios to provide transport speeds. Second, by manual operation of the supplementary drive on/off switch 36 which when opened will prevent power from being supplied to the power converter 38. Third, is by depressing the main drive clutch 23 which opens the main drive clutch switch 74 and prevents signals from reaching the servo actuated pump 92 or the forward and reverse solenoids 108 and 110 as will later be described. Fourth, is by opening the forward or reverse shuttle switches 76 or 78 which occurs when the shuttle lever 20 is in neutral. The rationale behind "on-off" control for the supplementary drive 24 as previously stated is to prevent drive action whenever the rear drive wheels 18 are nondriving.

In the normal mode with the shuttle lever 20 in forward, the gear shift lever 22 in one of the predetermined speed ratios, and the main drive clutch switch 74 closed, the power converter 38 provides power to the electronic control 34. The rear and front sensors 40 and 54 provide digital signals representative respectively of the rear differential input speed and the hydrostatic drive motor rotor speed to the respective command and feedback converters 42 and 52.

The command converter 42 provides a command signal to the command modifier 44 where it is inverted and modified by the first predetermined percentage to produce a signal which would be equivalent to producing a 3% difference between average rear drive wheel speed and front hydrostatic drive motor speed. The output of the command modifier 44 is a modified command signal which is processed by summing in the first summing circuitry 50 with a feedback signal which is the output of the feedback converter 52 to provide a servo signal.

It should be noted that for a given ground speed of the motor grader 10, the feedback and command signals will be different because the rear differential 16 and the hydrostatic drive motors 58 rotate at different speeds. Although this closed loop system could have been designed to null out the servo signal when the proper wheel speed relationships are reached, the preferred embodiment is designed with the modified command signal always greater than the feedback signal so that the servo signal will be directly proportional to the desired amount of actuation of the servo valve in the servo actuated pump 92.

The servo signal is inputted into the servo amplifier 62 to provide a gain which has been determined to be necessary to provide sufficient accuracy for the electronic control 34. The amplified servo signal output of the servo amplifier 62 is inputted to the servo filter 66. The servo filter 66 limits the rate of change in the amplified servo signal with a time constant which has been determined to be necessary to provide sufficient stability for this closed loop system. The servo filter 66 provides the amplified servo signal to the second summing circuitry 68.

With the overspeed selector 46 preventing the overspeed circuitry 48 from affecting the servo circuitry 64, the second summing circuitry 68 will provide a servo control signal which is equal to the amplified and filtered servo signal to the forward controller circuitry 80. With the forward shuttle switch 76 closed by the shuttle lever 20, the forward controller circuitry 80 will pass the servo control signal to the third summing circuitry 86 where it will be processed by summing with a dithered signal from the dither circuitry 90 to provide a control signal to the output circuitry 91 which changes the voltage signal to a current signal with an additional gain change for the servo actuated pump 92. The dithered signal is provided to assure responsiveness of the servo valve in the servo actuated pump 92 as would be evident to those skilled in the art.

With no signal from the reverse controller circuitry 88, the control signal would be of positive polarity which causes the servo valve actuated pump 92 to pressurize the forward pressure lines 94 and 100 to drive the drive motor 58 in the forward direction.

Since the forward shuttle switch 76 is closed, a signal will be sent to the forward pressure switch 104 which will be closed once the power shift transmission 14 is engaged for forward rotation. The forward pressure switch 104 then provides a forward actuation signal to the forward solenoid actuator 108 which causes the forward pressure line 94 to be connected in the hydraulic system 98 to the clutch pressure line 112.

As previously mentioned, as long as the front drive wheels 26 operate at the same speed as the rear drive wheels 18, they will free wheel because the hydraulic motors are controlled to 97% of rear wheel speed. When the rear drive wheels 18 slip by 3%, the front drive wheels 26 will rotate at the same speed as the hydraulic motors and will no longer overrun and the clutches 60 will be engaged by the pressure in the clutch pressure lines 112 to cause the drive motors 58 to drive the front wheels 26.

When the shuttle lever 20 is in reverse, the forward shuttle switch 76 is open and the reverse shuttle switch 78 is closed. The signals through the second summing circuitries 68 are the same and the servo control signal into the forward controller circuitry 80 is the same; however, the forward controller circuitry 80 provides the servo control signal to the inverter 84 which provides an inverted servo control signal to the reverse controller circuitry 88. When reverse controller circuitry 88 is provided with a signal from the reverse shuttle switch 78, the inverted servo control signal is directed to the third summing circuitry 86 where it is summed with the dither signal from the dither circuitry 90. With an inverted servo control signal and no servo control signal from the forward controller circuitry 80, the control signal will be of a negative polarity which causes the servo valve actuated pump 92 to pressurize the reverse pressure lines 96 and 102 to drive the drive motors 58 in reverse.

Also with the reverse shuttle 78 closed, power is presented to the reverse pressure switch 106 which, when the power shift transmission 14 is operating in reverse, will provide a reverse actuator signal for the reverse solenoid actuator 110 which will cause the reverse pressure line 96 to pressurize the clutch pressure lines 112.

The overspeed mode is activated in two separate ways. The first manner is by switching the overspeed selector 46 to allow the modified command signal from the command modifier 44 to pass through to the overspeed filter 72. In the overspeed filter 72, increasing modified command signals are regulated to increase at the second predetermined rate and decreasing signals to decrease at the third predetermined rate. In the preferred embodiment, the increasing rate is established by a time constant to be as fast as possible consistent with operation of the command converter circuitry 42 while the decreasing rate is established by another time constant to be the same as the time constant of the servo filter 66.

The modified command signal after filtering is then supplied to the overspeed modifier 70 which modifies the signal by a predetermined amount to provide an overspeed signal for summing in the second summing circuitries 68 with the amplified servo signal from the servo filter 66, the servo control signal will be representative of the speed of the front drive wheels 26 running 1% faster than or at 101% of the speed of the rear drive wheels 18.

The second manner of activating the overspeed mode occurs automatically in the normal mode of operation when the shuttle lever is shifted initially into forward or reverse from neutral or shifted between forward and reverse.

When going into forward with the shuttle lever 20, the forward shuttle switch 76 is closed to provide a signal to the forward controller circuitry 80 which in turn provides a signal to the hold circuitry 82. By reference to FIG. 3, it may be seen that the incoming signal through the resistor 228 causes the transistor 226 to turn on and ground the lead 222 which fires the one-shot 220. In the preferred embodiment, the one-shot 220 will stay on for approximately 4 seconds to turn the transistor 218 on and provide a V1 voltage in the lead 216. The V1 voltage in the lead 216 causes the diode 208 to become reversed biased to turn on the field effect transistor 202 so as to connect the input line 200 with the output line 204 and pass the modified command signal to the overspeed filter 72. The reverse controller circuitry 88 functions in the very same way.

During the 4 second period when the one shot 220 is active immediately after a shuttle shift into forward or reverse, the overspeed filter 72 will pass the modified command signal through without effect because the rise time constant therein is selected to be very short so as to pass frequencies from the command converter circuitry 42. This will permit the overspeed signal from the overspeed modifier 70 into the second summing circuitry 68 to be unregulated with regard to response time and thus the servo actuated pump 92 will drive the hydrostatic drive motors 58 to increase in speed at the same rate at which the rear drive wheels 18 change. When the predetermined hold on period is completed, and the one-shot 220 turns the transistor 218 off so as to bring the line 216 voltage down to V2 to allow the diode 208 to conduct and shut the field effect transistor 202 off, the overspeed signal from the overspeed filter 72 will decay at the same rate at which the amplified servo signal out of the servo filter 66 increases so that the servo control signal out of the second summing circuitry 68 will remain relatively constant.

The different rise and decay rates in the overspeed filter circuitry are achieved by charging the capacitor 250 through the resistor 248 to obtain one time constant for the second predetermined rate of change and discharging the capacitor 250 through the resistor 252 to obtain the other time constant for the third predetermined rate of change. Thus one rate is obtained for increasing signals and another for decreasing signals.

One problem which was encountered with operation of the electronic control 34 during rapid shuttle shifts between forward and reverse, as for example when the motor grader 10 is struck and the operator desires to rock the vehicle back and forth to obtain traction to get unstuck, was that the servo filter 66 could not reduce the amplifier servo signal quickly enough because of the time constant. Therefore, the circuit was set up through the use of transistors 226 and 234 and lead 222 to assure that the capacitor 240 would be discharged whenever the shuttle lever 20 is positioned in neutral.

As seen by reference to FIG. 3, as long as there is an input signal to the transistor 226 from the forward or reverse control circuitry 80 or 88, the lead 222 will be grounded causing the transistor 234 to be off and the capacitor 240 to act as it normally would. As soon as the shuttle lever 20 is shifted into neutral, the transistor 226 turns off and the transistor 234 turns on to cause the capacitor 240 to be discharged to ground through the resistor 236 and the transistor 234 which provides another small time constant.

Another problem which was encountered was the need to provide for the situation where a load causes the motor grader 10 to stop with the front drive wheels 26 stalled and the rear drive wheels slipping. Since the feedback signal goes to zero while the modified command signal continues unabated, the servo actuated pump will start to increase its output pressure until a safety valve opens in the hydraulic system 98. At lower transmission speeds, there is a severe power loss because fluid is being pumped through a safety valve without doing any useful work. At higher transmission speeds, the power loss causes the engine 12 to stall.

This problem was solved by the addition of the clamp circuitry 73 which utilizes the modified command signals to establish maximum values to which the servo control signal will be clamped to prevent excessive hydraulic flow from the servo actuated pump 92; i.e. as the modified command signal increases, the servo control signal clamp voltage increases. As evident to those skilled in the art, merely limiting the servo control signal to a single maximum or limiting the difference between the modified command and feedback signals are insufficient to solve this problem.

In order to have the supplementary drive 24 operate properly in conjunction with the rear drive wheels 18, it is necessary to include both shuttle switches and pressure switches to activate the solenoid actuators because the power shift transmission 14 is subject to modulation and delays during changes in direction. The shuttle shift switches alone are insufficient since they are instantaneously acting while the rear drive wheels 18 may not have changed direction due to the modulation. Similarly, pressure switches alone are insufficient because it is possible for both pressure switches to be closed between shifts in the power shift transmission 14.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. An electronic control for a vehicle having variable speed, reversible, main and supplementary drives operable to propel said vehicle, comprising: main drive sensor means operatively associated with the main drive for providing a command signal representative of the speed of the main drive; command modifier means connected to the main drive sensor means for modifying the command signal by a first predetermined percentage to provide a modified command signal representative thereof; supplementary drive sensor means operatively associated with the supplementary drive and providing a feedback signal representative of the speed of the supplementary drive; servo means connected to the command modifier means and the supplementary drive sensor means for processing the modified command signal and the feedback signal to provide a control signal representative of the difference therebetween; and servo actuated means connected to the servo means and the supplementary drive responsive to the control signal to change the speed of the supplementary drive in proportion thereto whereby the supplementary drive will operate at a speed differing from the speed of the main drive by the first predetermined percentage.

2. The electronic control as claimed in claim 1 including overspeed means connected to the command modifier means and the servo means for selectively modifying the modified command signal by a second predetermined percentage to provide an overspeed signal representative thereof and wherein the servo means includes means connected to the overspeed means to change the control signal proportionately in response to the overspeed signal whereby the supplementary drive will be operable at a speed differing from the speed of the main drive by a third predetermined percentage.

3. The electronic control as claimed in claim 2 wherein the servo means includes servo filter means for regulating the rate of change of the processing of the modified command signal and the feedback signal to a first predetermined rate, and wherein the overspeed means includes overspeed filter means for regulating the rate of increase of the overspeed signal to a second predetermined rate, and the rate of decrease of the overspeed signal to a third predetermined rate substantially equal to the first predetermined rate.

4. The electronic control as claimed in claim 3 including clamping means connected to the command modifier means and the servo means responsive to the modified command signal for limiting the maximum control signal in proportion to the modified command signal.

5. The electronic control as claimed in claim 4 including forward and reverse sensing means operatively associated with the main drive and respectively responsive to the forward and reverse operation of the main drive to respectively provide forward and reverse signals and wherein the servo means includes controller means responsive to the forward signal to provide the control signal to the servo actuated means for forward supplementary drive operation and to the reverse signal to modify the control signal to the servo actuated means for reverse supplementary drive operation.

6. The electronic control as claimed in claim 5 including holding means operatively connected to the controller means, the forward and reverse sensing means, and the overspeed means responsive to the forward or the reverse signal to select the overspeed means to provide the overspeed signal for a predetermined time.

7. The electronic control as claimed in claim 6 wherein the holding means includes means connected to the servo means responsive to the absence of the forward and reverse signals to cause the servo means to stop processing the modified command signal and the feedback signal.

8. An electronic control for a vehicle having an engine, a hydraulically speed shiftable and reversible transmission driven by the engine, a differential driven by the transmission, a pair of main drive wheels driven by the differential, a servo actuated fluid pump driven by the engine and responsive to a control signal to provide pressurized fluid in proportion thereto, a pair of reversible hydrostatic wheel fluidly powered by the pump and speed changeable in response to the pressure of the pressurized fluid, a fluidly actuated clutch connected to each of the wheel motors to be selectively driven thereby, and a pair of supplementary drive wheels to be driven by the clutches, comprising: differential sensor means operatively associated with the differential for providing a command signal representative of the average speed of the main drive wheels; command modifier means connected to the differential sensor means for inverting and modifying the command signal by a first predetermined percentage and providing a modified command signal representative thereof; motor sensor means operatively associated with one of the pair of wheel motors for providing a feedback signal representative of the speed thereof; first summing means connected to the command modifier means and the motor sensor means for providing a servo signal representative of the sum of the modified command signal and the feedback signal; servo amplifier means for providing an amplified servo signal representative of the servo signal amplified by predetermined gain; controller means operatively associated with the servo amplifier means and the transmission sensing means to provide the control signal proportional to the amplified servo signal when the transmission is driving the differential; and transmission sensing means operatively associated with the controller means and the transmission to provide fluid to actuate the clutch when the transmission is driving the differential whereby the supplementary drive wheels will be driven at a speed differing from the speed of the main drive wheels by the first predetermined percentage.

9. The electronic control as claimed in claim 8 including overspeed selector means connected to the command modifier means to selectively allow and block the modified command signal therethrough; overspeed means connected to the overspeed selector means for modifying the modified command signal by a second predetermined percentage and providing an overspeed signal representative thereof; second summing means connected to the overspeed means and disposed between the servo amplifier means and the controller means to sum the amplified servo signal and the overspeed signal to provide a servo control signal to the controller means; and means in the controller means responsive to the servo control signal to change the control signal in proportion thereto whereby the supplementary drive wheels will be driven at a speed differing from the speed of the main drive wheels by a third predetermined percentage.

10. The electronic control as claimed in claim 9 wherein the servo means includes servo filter means for regulating the rate of change of the amplified servo signal to a first predetermined rate, and wherein the overspeed means includes overspeed filter means for regulating the rate of increase of the overspeed signal to a second predetermined rate and the rate of decrease of the overspeed signal to a third predetermined rate substantially equal to the first predetermined rate and slower than the second predetermined rate.

11. The electrode control as claimed in claim 10 including clamping means connected to the command modifier means and between the servo filter means and the controller means responsive to the modified command signal for clamping the control signal in direct proportion to the modified command signal.

12. The electronic control as claimed in claim 11 wherein the transmission sensing means includes forward and reverse sensing means connected to the transmission respectively providing forward or reverse signals in response to forward or reverse direction thereof, the controller means includes forward controller means connected to the second processing means and responsive to the forward signal to allow the servo control signal therethrough, the controller means includes inverter means connected to the forward controller for inverting the servo control signal and providing an inverted servo control signal, the controller means includes reverse controller means responsive to the reverse signal to allow an inverted servo control signal therethrough, and including third summing means disposed between the controller means and the servo actuated pump connected to the forward and reverse controller means to sum the servo control and inverted servo control signals and provide the control signal respectively representative thereof.

13. The electronic control as claimed in claim 12 including hold means operatively connected to the forward and reverse controller means and the overspeed selector means responsive to a change between the forward and reverse signals to cause the overspeed selector means to allow the modified command signal therethrough for a predetermined time.

14. The electronic control as claimed in claim 13 including servo means disposed between the amplifier means and the second processing means and connected to the hold means responsive to the hold means causing the overspeed selector means to provide the modified command signal therethrough to block the amplified servo signal between the amplifier means and the second processing means.

15. In a vehicle having an engine, an engine driven transmission shiftable between forward and reverse in response respectively to forward and reverse pressure signals, a shuttle controller having a lever positionable between forward and reverse positions to respectively effect the forward and reverse pressure signals, a differential connected to the transmission and driven thereby, a pair of main drive wheels connected to the differential for propelling the vehicle, an engine-driven, reversible, variable displacement fluid pump operable in response to a positive or negative control signal to respectively provide pressurized fluid in a forward or reverse pressure line connected thereto in proportion to the control signal, a pair of reversible fluid motors connected to the forward and reverse pressure lines to be driven by the pressurized fluid therein, a pair of auxiliary drive wheels; a pair of drive means respectively connecting the pair of motors to the pair of drive wheels; said pair of drive means respectively including a pair of fluidly activated clutches for establishing a drive connection between the pair of fluid motors, and the pair of wheels only when the clutches are activated, conduit means connected between the forward and reverse pressure lines and to a pair of clutches and including valve means responsive to a forward or reverse actuator signal to connect the pressurized fluid in the forward or reverse pressure line to activate the pair of clutches, an electronic control comprising: main drive sensor means operatively associated with the connection between the transmission and the differential for sensing the speed thereat and providing a command signal representative thereof; command modifier means connected to the main drive sensor means for modifying the command signal by a first predetermined percentage thereof and providing a modified command signal representative operatively associated with one of the pair of fluid motors and providing a feedback signal representative of the speed thereat; first summing means connected to the command modifier means and the supplementary drive sensor means for summing the modified command and feedback signals to provide a servo signal representative of the difference therebetween; amplifier means connected to the first summing means for amplifying the servo signal to provide an amplified servo signal; servo filter means connected to the amplifier means for regulating the rate of change of the amplified servo signal to a first predetermined rate; overspeed selector means connected to the command modifier means selectively actuatable to block or allow the modified command signal therethrough; overspeed filter means connected to the overspeed selector means for regulating the rate of change of the modified command signal to a second predetermined rate; overspeed modifier means connected to the overspeed filter means for modifying the modified command signal therefrom by a second predetermined percentage thereof and providing an overspeed signal representative thereof; second summing means connected to the servo filter and the overspeed modifier means for summing the servo and overspeed signals and providing a servo control signal representative of the sum thereof; forward controller means connected to the second summing means and the shuttle controller responsive to the forward and reverse pressure signals and positions of the lever to provide the servo control signal respectively to first and second outputs provided therein, said forward controller means including means connected to the clutch valve responsive to the forward pressure signal and position of the lever to provide the forward actuator signal to the clutch valve; inverter means connected to the first output of the forward controller means for inverting the servo control signal to provide an inverted servo control signal; reverse controller means connected to the inverter means and the shuttle controller means responsive to the reverse pressure signal and position of the lever to block or allow the inverted servo control signal therethrough, said reverse controller means including means connected to the clutch valve responsive to the reverse pressure signal and position of the lever to provide the reverse actuator signal to the clutch valve; and third summing means connected to the fluid pump and the output of the forward controller means and the reverse controller means for summing the servo control and inverted servo control signals to provide the positive or negative control signal representative of the sum thereof to the fluid pump.

16. The electronic control as claimed in claim 15 wherein the servo means includes servo filter means for regulating the rate of change of the amplified servo signal to a first predetermined rate, and wherein the overspeed means includes overspeed filter means for regulating the rate of increase of the overspeed signal to a second predetermined rate and the rate of decrease of the overspeed signal to a third predetermined rate substantially equal to the first predetermined rate and slower than the second predetermined rate.

17. The electronic control as claimed in claim 16 including overload clamping means connected to the command modifier means and between the second summing means and the forward controller means responsive to the modified command signal for clamping the servo control signal in direct proportion to the modified command signal.

18. The electronic control as claimed in claim 17 wherein the forward and reverse controllers respectively include means for providing forward and reverse shuttle signals, and including holding means connected to the forward and reverse controller means, the servo filter means, and the overspeed selector means responsive to the forward or reverse shuttle signal to cause the servo filter to block the amplified servo signal therethrough and to allow the modified command signals through the overspeed selector for a predetermined time.

19. The electronic control as claimed in claim 18 including servo means disposed between the amplifier means and the second processing means and connected to the hold means responsive to the hold means causing the overspeed selector means to provide the modified command signal therethrough to block the amplifed servo signal between the amplifier means and the second processing means.

20. The electronic control as claimed in claim 19 wherein the hold means is connected to the servo filter means and includes means responsive to the hold means causing the overspeed selector means to provide the modified command signal therethrough to block the amplified servo signal between the amplifier means and the second summing means.

21. In combination with a vehicle including a reversible main traction drive transmission having differential gearing connected to a set of main traction drive wheels and having a direction controller movable between forward and reverse drive-effecting positions, and, a set of auxiliary traction drive wheels, and auxiliary traction drive system for driving the auxiliary drive wheels, comprising: a reversible variable displacement pump including a direction and displacement controller; fluid motor means; supply-return conduit means connecting the pump to the motor means; an auxiliary drive connection means releasably coupling the motor means to the auxiliary traction drive wheels; an electrically responsive actuator connected for adjusting the controller to effect direction and displacement changes in the pump in correspondence to the magnitude and polarity of electrical signals received by the actuator; a member coupled to the differential gearing for being driven thereby at a speed corresponding to the average speed of rotation of the main traction drive wheels; electrical control circuit means including a signal processing circuitry to which is connected a command input speed sensor and a direction input means; said speed sensor being mounted adjacent the member coupled to the differential gearing and operable for sending an electrical signal, representative of the speed of rotation of the member, to the processing circuitry and said direction input means being connected to the direction controller for operation thereby to respectively send electrical signals representative of forward and reverse operation to the processing circuitry in response to the controller being moved to its forward and reverse drive effecting positions; and said processing circuitry being connected to the actuator for outputting an electrical signal thereto having a magnitude and direction corresponding to the average speed and to the direction of rotation of the main traction drive wheels, whereby the pump will be controlled to drive the wheel motor means in a direction and at a speed corresponding to a direction and average speed of rotation of the main traction drive wheels at any given time.

* * * * *

UNITED STATES PATENT OFFICE
CERTIFICATE OF CORRECTION

Patent No. 4,186,816    Dated 5 February 1980

Inventor(s) Donald K. Pfundstein

It is certified that error appears in the above-identified patent and that said Letters Patent are hereby corrected as shown below:

Column 11, line 45, delete "electrode" and insert -- electronic --.

Signed and Sealed this

Twenty-sixth Day of August 1980

[SEAL]

Attest:

SIDNEY A. DIAMOND

Attesting Officer    Commissioner of Patents and Trademarks